(12) United States Patent
Fox et al.

(10) Patent No.: US 7,584,884 B2
(45) Date of Patent: Sep. 8, 2009

(54) SYSTEM AND METHOD FOR CAPTURING SALES TAX DEDUCTION INFORMATION FROM MONETARY CARD TRANSACTIONS

(75) Inventors: Eric D. Fox, Richmond, VA (US); Robert W. Gregory, Jr., Mechanicsville, VA (US)

(73) Assignee: Capital One Financial Corporation, McLean, VA (US)

( * ) Notice: Subject to any disclaimer, the term of this patent is extended or adjusted under 35 U.S.C. 154(b) by 583 days.

(21) Appl. No.: 11/221,229

(22) Filed: Sep. 6, 2005

(65) Prior Publication Data

US 2007/0055571 A1    Mar. 8, 2007

(51) Int. Cl.
*G06Q 40/00* (2006.01)
(52) U.S. Cl. ............ 235/379; 705/19; 705/31
(58) Field of Classification Search ........ 235/383, 235/379; 705/19, 39, 16, 31
See application file for complete search history.

(56) References Cited

U.S. PATENT DOCUMENTS

| | | | | |
|---|---|---|---|---|
| 5,335,169 | A * | 8/1994 | Chong | 705/31 |
| 5,903,876 | A * | 5/1999 | Hagemier | 705/19 |
| 6,078,898 | A | 6/2000 | Davis et al. | 705/19 |
| 6,078,899 | A * | 6/2000 | Francisco et al. | 705/19 |
| 6,546,373 | B1 * | 4/2003 | Cerra | 705/19 |
| 2001/0047342 | A1 | 11/2001 | Cuervo | 705/66 |
| 2002/0111888 | A1 * | 8/2002 | Stanley et al. | 705/31 |
| 2004/0002906 | A1 | 1/2004 | Von Drehnen et al. | 705/31 |
| 2004/0019522 | A1 | 1/2004 | Bortolin et al. | 705/14 |
| 2004/0236688 | A1 | 11/2004 | Bozeman | 705/42 |
| 2005/0096989 | A1 * | 5/2005 | Ostlund | 705/19 |

FOREIGN PATENT DOCUMENTS

| | | |
|---|---|---|
| EP | 1 359 523 | 11/2003 |
| WO | WO 98/41956 | 9/1998 |
| WO | WO 00/30001 | 5/2000 |
| WO | WO 03/048996 | 6/2003 |
| WO | WO 03/094063 | 11/2003 |
| WO | WO 2004/012052 | 2/2004 |
| WO | WO 2004/090673 | 10/2004 |

OTHER PUBLICATIONS

Takasaki, et al., "*IC Card Sales Device and Storage Medium,*" Summary only, Publication No. 11272751 JP, published Oct. 8, 1999.

* cited by examiner

*Primary Examiner*—Daniel A Hess
(74) *Attorney, Agent, or Firm*—Hunton & Williams LLP

(57) ABSTRACT

Systems and methods are provided for managing sales tax information. The information may be generated, for example, in connection with transactions involving financial accounts, such as a credit card account. The sales tax information may be received electronically from, for example, a merchant or a point of sale device. A determination may be made whether there is any missing sales tax information. If there is missing information a request may be generated and sent to a source having the information. The source may receive the request, retrieve the desired information, and transmit it to the requesting entity. The sales tax information may be stored and later retrieved for presentation to a user, such as the account holder. The account holder may use the information in completing a tax return.

16 Claims, 2 Drawing Sheets

US 7,584,884 B2

SYSTEM AND METHOD FOR CAPTURING SALES TAX DEDUCTION INFORMATION FROM MONETARY CARD TRANSACTIONS

TECHNICAL FIELD OF THE INVENTION

This invention relates in general to monetary card transactions and, more particularly, to systems and methods for capturing information from such transactions to assist in tracking and reporting data for purposes of claiming sales tax deductions.

BACKGROUND

In certain circumstances, taxing jurisdictions may allow for a deduction of sales tax paid during the taxing period. For example, the American Jobs Creation Act of 2004 gives taxpayers the option to claim state and local sales taxes instead of state and local income taxes when they itemize deductions. Currently, this option is available for the 2004 and 2005 returns only, but may be extended. Additionally, similar laws may exist or be enacted in other jurisdictions. In connection with current federal law, tables are available to enable taxpayers to determine their sales tax deduction amount in lieu of saving their receipts throughout the year. Taxpayers use their income level and number of exemptions to find the sales tax amount for their state. The table instructions explain how to add an amount for local sales taxes if appropriate. Taxpayers also may add to the table amount any sales taxes paid in connection with certain purchases such as a motor vehicle, aircraft, boat, or home.

Taxpayers often use a monetary card to make purchases which include sales tax. An example of such a monetary card is a credit card. Credit cards are cards associated with a credit account. A credit card issuer, such as a bank or other financial institution, generally provides credit accounts to customers, or cardholders, allowing the customers to make purchases on credit rather than using cash. A customer incurs debt with each credit card purchase which may be repaid over time according to the terms and conditions of the particular customer's credit account. Credit card accounts provide a customer one or more lines of credit, typically including at least one revolving credit line in which the customer may choose to pay the full amount of debt owed on an account by a specified date or alternatively defer payment of all or a portion of the debt to a later date. The credit card issuer typically charges the customer interest or finance charges for such deferred payments during the period of deferral.

The credit card issuer typically establishes a credit limit for each credit account defining the maximum amount of credit available to the customer for making purchases at any given time. When a customer makes a credit card purchase, the amount of credit available to the customer, often called the available balance, is reduced by the amount of the purchase, and the amount of debt currently owed by the customer, often called the outstanding balance, is increased by the amount of the purchase.

It is common for consumers to make purchases using a card, which is linked to a financial account. The card may be any of a variety of types including debit, credit, or stored-value cards. The accounts may similarly be of a variety of types including checking, savings, or credit accounts. The card may be scanned, swiped, or otherwise processed at the location at which the purchase transaction is being conducted. This location is sometimes referred to as the Point of Sale ("POS"). A POS device, such as an electronic card reader, may be used to scan the card, thus reading electronic information stored on a magnetic strip or on a chip on, or inside, the card. The electronic card reader may be coupled, via a telecommunications system to one or more computers located at the purchase site and/or at remote sites, such as banks and card issuers. The electronic information is used by the various computers to process the transaction and electronically transfer funds from one account to another, such as from the consumer's credit account to the merchant's bank account, in order to complete the transaction.

SUMMARY

In accordance with the present invention, systems and methods for providing and managing transactions made using a monetary card and capturing certain transaction information. The information is associated with the sales tax incurred by purchasing items using the card. The information may be stored and later retrieved to assist a consumer in preparing a tax return in which sales tax may be claimed as a deduction.

According to one embodiment, a system is provided for managing sales tax information associated with purchases made using a financial account. The system includes at least one processor, at least one database electronically coupled to the processor, and a sales tax information management module operable to receive sales tax information corresponding to at least one transaction made using the financial account. The sales tax information management module is further operable to process the information and provide the information to an entity requesting the sales tax information.

According to another example embodiment, a method is provided for managing sales tax information associated with purchases made using a financial account. One step is receiving transaction information associated with a transaction made using the financial account. The transaction information includes sales tax information. Another step is storing the sales tax information. Another step is providing the sales tax information to a user in response to a request for the sales tax information.

Various embodiments of the present invention may benefit from numerous advantages. It should be noted that one or more embodiments may benefit from some, none, or all of the advantages discussed below.

One advantage of the invention is that taxpayers can automatically track their sales tax expenditures without having to, for example, manually collect receipts. This enables taxpayers to easily determine whether, in a taxation scenario that allows for a sales tax deduction to be calculated in multiple ways, a deduction based on the actual sales tax paid in a given period will be preferable to some other method of calculating the deduction.

Another advantage is that sales tax information may be automatically collected without the need for involvement of the consumer. Sales tax information may be sent electronically from a point of sale device to a data storage device for later retrieval.

Another advantage is a reduction in errors in the calculation of a sales tax deduction. Because sales tax information is automatically collected by, for example, a computer system, errors are reduced in comparison to, for example, a manual system.

Another advantage is the potentially persistent storage of sales tax information. Electronic storage of the sales tax information on a data storage device facilitates retrieval of the information beyond the period when the information might first be needed. For instance, the information might be retrieved a first time shortly before a tax reporting time.

However, the information is still electronically stored should it become necessary for future reporting times or, for example, an audit.

Another advantage is the automatic retrieval of sales tax information from a data storage device and the automatic use of the information in the preparation of an electronic tax return.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION

Certain embodiments of the present invention are generally directed to the tracking, storage, and management of sales tax information generated as the result of transactions involving a monetary card. The monetary card may be, for example, a credit card. The transactions may be, for example, instances in which a consumer uses the card to make purchases. The purchases may be made at a store and the card may be used by interfacing with a point of sale device. Information about the card holder's account may be stored, for example, on a magnetic stripe on the card. The card may be swiped through, inserted into, or scanned by, a card reader on the point of sale device. Information from the card may be used to access the card holder's account. Sales tax information resulting from the transaction may be automatically generated by the point of sale device, or by a sales device associated with the point of sale device. The sales tax information may be electronically communicated to a sales tax information management system and stored in a database as, for example, a record. The record may be stored in connection with the particular card holder's account. For example, the transaction record may include a card holder identification code. When the card holder needs the sales tax information for a given period, software operating within the sales tax information management system may be executed and operable to retrieve the sales tax information for the requester from the database. The software may be further operable to format the information in any of a plurality of possible formats. The software may be further operable to cooperate with a tax return preparation application and automatically provide the information to the application for use in determining a sales tax deduction in a tax return.

Figure 1:
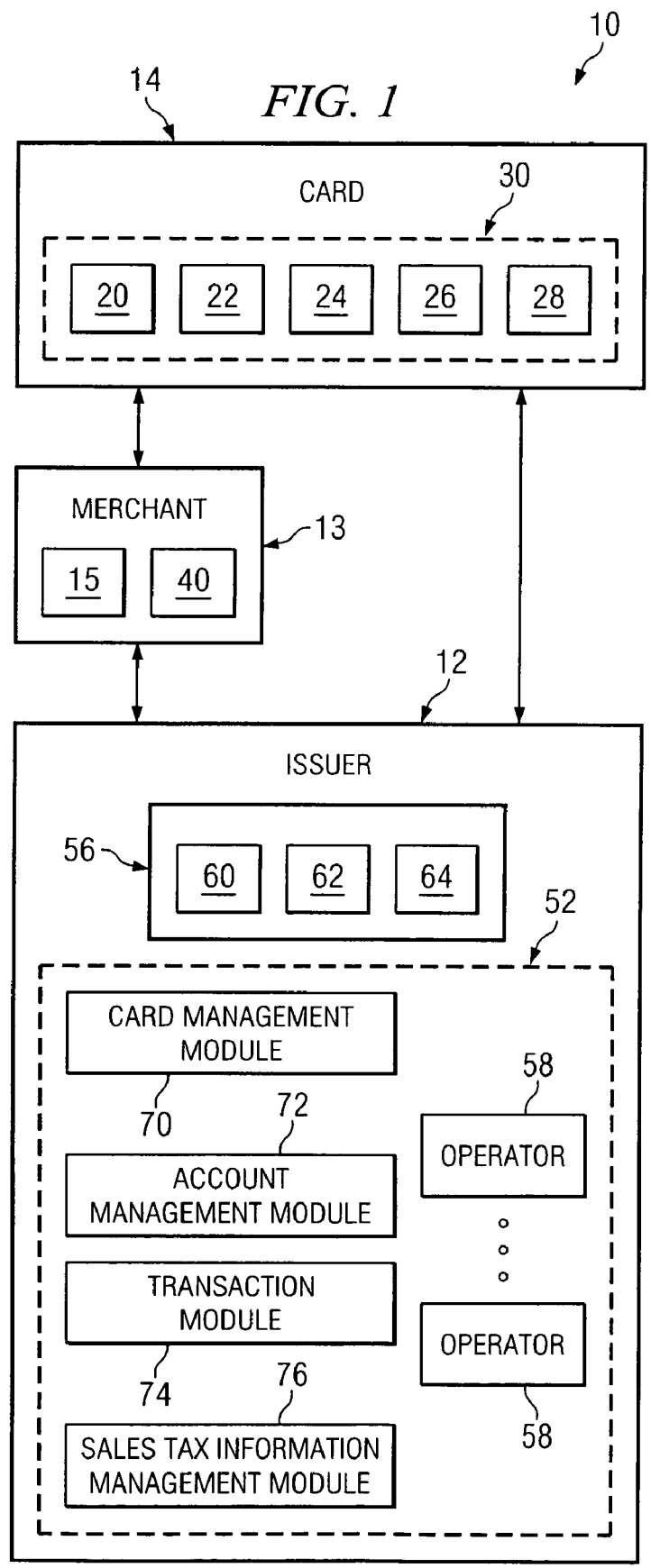
FIG. 1 illustrates an example system for providing, activating, and using a monetary card to make purchases in accordance with an embodiment of the invention.
Figure 2:
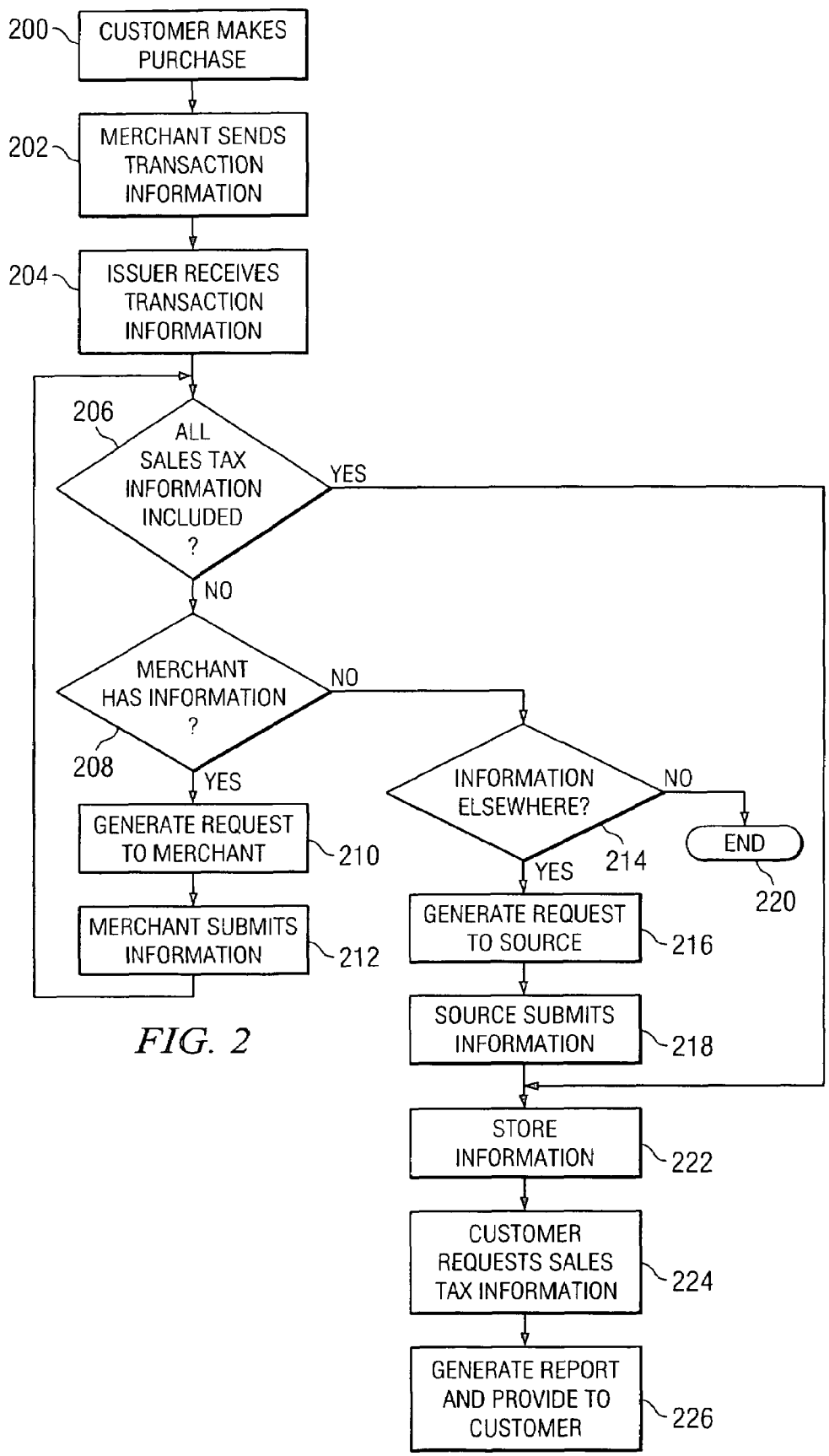
FIG. 2 illustrates an example method for tracking sales tax information resulting from transactions involving the use of a monetary card.

Example embodiments of the present invention and their advantages are best understood by referring now to FIGS. 1 and 2 of the drawings, in which like numerals refer to like parts.

FIG. 1 illustrates an example system 10 for providing, activating, and using a monetary card to make purchases in accordance with an embodiment of the invention. System 10 may include an issuer 12 and a plurality of monetary cards 14 provided by issuer 12. Generally, an issuer provides cards 14 to customers that may be used to make purchases from merchants that accept the cards 14 as a form of payment for goods or services.

A card 14 may be any card having one or more memory devices 30 provided on the card 14 that can store various data, such as a monetary value 20, a customer identification code 22, a card identification code 24 an expiration date 26, and/or an account number 28 as discussed below. As used herein, the phrase "provided on card 14" with reference to memory devices 30 or other devices (e.g., a processor) describes any physical coupling of such devices to a card 14, such as the device being provided on a surface of the card 14, located at least partially within the card 14, or otherwise physically coupled to the card 14. For example, a card 14 may be any suitable monetary card such as a credit card, a stored-value card, a smart card, a gift certificate card, a store card, a payroll card, a government benefits card, a telephone calling card, or a mall card that includes memory for storing various data related to the card 14, the issuer 12, and/or the customer.

The customer identification code 22 stored on a card 14 may provide security to prevent the card 14 from being used by unauthorized persons. For example, in some embodiments, in order to make purchases using the card 14, a customer (e.g. the card holder) must provide a code matching the customer identification code 22 stored on the card, such as by verbally communicating the code to a cashier or other personnel associated with the relevant merchant 13 or by entering the code into a customer interface, such as a card interface device 40, for example. In some embodiments, the customer identification code 22 is similar to a PIN or other security code, and may be selected by the purchaser or owner of the card 14, or by the merchant 13. Each customer identification code 22 may include any number, combination and/or configuration of numbers, letters, symbols, characters, or any other data that may allow that customer identification code 22 to be identified and/or distinguished from other customer identification codes 22. The customer identification code 22 may be stored in a memory device 30 provided on the card 14, which may or may not be the same memory device 30 that stores the monetary value 20, card identification code 24 and/or expiration data 26 of the card 14.

The card identification code 24 stored on a card 14 may be used to identify the card 14 from other cards 14. In some embodiments, each card 14 has a unique identification code 24. Card identification code 24 may be stored in a memory device 30 on card 14, which may or may not be the same memory device or devices 30 that store the monetary value 20, customer identification code 22 and/or expiration date 26 on the card 14.

The expiration date 26 stored on a card 14 may indicate a date and/or time that the card 14 may expire, may also be stored in a memory device 30 on card 14, which may or may not be the same memory device or devices 30 that store the monetary value 20, customer identification code 22 and/or card identification code 24 on the card 14.

The account number 28 may identify the account associated with the card and/or the card holder. The account may be any type of financial account which may be associated with the monetary card 14. For example, when card 14 is a credit card, the associated account may be a credit card account. The account number enables system 10 to determine which account information it needs to access to conduct transactions involving the particular card holder using card 14 to make purchases. The account number also enables system 10, or a user of system 10, to access information concerning the account. Such information may include any information associated with a financial account. This may include, without limitation, name, address, telephone number, social security number, credit limit information, available credit information, available funds information, billing history, payment history, identification codes, interest paid, and the like.

The monetary value 20, customer identification code 22, card identification code 24, expiration date 26, and/or account number 28 may be stored in the same memory device 30, in separate memory devices 30 of the same type, or in separate memory devices 30 of different types. Memory device or devices 30 on a card may include any device or devices suitable to store data, such as one or more magnetic stripes, transistors, RFID devices, and/or memory chips, such as random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), or flash memory, for example. Other electronic devices may also be stored on cards 14, such as a processor operable to process various data stored in memory device(s) 30, for example.

To make a purchase using the card 14, the cardholder presents the card 14 to a card interface device 40 provided by merchant 13. The presentation may be accomplished by swiping the card, inserting the card, scanning the card, or keying in information on, or associated with the card.

Card interface 40 may include any device or devices for reading information from and/or writing information to cards 14. For example, card interface 40 may be a credit card authorization interface, a smart card reader, a debit card reader, or a stored value card reader, for example. Card interface device 40 may be operable to read data from and/or write data to one or more types of memory devices 30 provided on cards 14. Card interface device 40 may interface with such memory devices 30 provided on cards 14 via physical contact or otherwise, such as via radio or electromagnetic waves, for example.

Card interface device 40 may read the current monetary value 20, customer identification code 22, card identification code 24, expiration data 26, and/or account number from memory device(s) 30 on card 14. The card holder may then provide (or attempt to provide) a code matching the customer identification code 22, such as by speaking the code to the cashier or other personnel associated with the merchant 13 or by manually (e.g. by typing or keying) or otherwise entering the code into a customer interface, such as a card interface device 40, for example. The merchant 13 may then compare the customer identification code 22 read from the card 14 with the code provided by the cardholder. This comparison may be performed or at least facilitated by any suitable computerized system, such as card interface device 40 or any other computer system associated with or available to merchant 13. Alternatively, the cashier or other personnel associated with the merchant 13 may manually compare the customer identification code 22 read from the card 14 with the code provided by the cardholder. If the customer has provided the correct code, and if the current monetary value 20 read from the card 14 is sufficient for the purchase, merchant 13 may execute the purchase by reducing the current monetary value 20 stored in the memory of card 14 by the amount of the purchase.

Card interface device 40 may be part of, or otherwise electronically coupled, to a sales device 15. Sales device 15 may be any point of sale device such as an electronic cash register or a computer. While sales device 15 and card reader 40 are shown as separate device, they may be combined into a single device.

Preferably, card reader 40 and/or sales device 15 are electronically connected to a communications network 41, which is in turn connected to issuer 12. Issuer 12 may be, for example, a financial institution or any other entity which manages accounts associated with card 14. Issuer 12 may be a bank or a credit card issuer, for example.

Merchant 13 may include any entity suitable for accepting payment from cards 14 in exchange for various products or services. A merchant 13 may include a single entity (such as, for example, an individual store) or a number of entities (such as, for example, a chain of stores). A merchant 13 may include a seller or distributor that sells items produced by one or more otherwise unaffiliated producers. In addition or as an alternative, a merchant 13 may include a producer that sells one or more items it produces directly to customers using cards 14, bypassing distributors. Merchant 13 may include one or more outlets at one or more physical locations and may, in addition or as an alternative, include one or more call centers where phone orders are received from customers using cards 14, one or more websites or other virtual locations where electronic orders are received from customers using cards 14, and/or one or more warehouses (which may be owned by merchant 13 or owned by one or more entities separate from merchant 13 for which merchant 13 sells items to cardholders) where orders received from customers using cards 14 are filled. Although merchants 13 are described as selling items to customers using cards 14, the present invention, as described above, contemplates any suitable transactions between merchants 13 and customers using cards 14. As an example, a merchant 13 may rent one or more items to customers using cards 14. As another example, a merchant 13 may include an entity which provides services in exchange for payment from a customer using a card 14, such as a barber or auto mechanic, for example.

Issuer 12 may include a data management system 56 that provides various functionalities with respect to cards 14 and their associated accounts. Issuer 12 may further include a plurality of function modules 52 and one or more operator terminals 58. The components of issuer 12 may be located at one or more sites and may be coupled to each other using one or more links, each of which may include, for example, some or all of a computer bus, local area networks (LANs), metropolitan area networks (MANs), wide area networks (WANs), portions of the Internet, a public switched telephone network (PSTN), any other appropriate wireline, optical, wireless, or other suitable communication link, or any combination of the preceding.

An operator terminal 58 may provide an operator, manager, other employee, or other individual associated with issuer 12 with access to data management system 56 and function modules 52 to obtain information from, exchange information with, manage, configure, or otherwise interact with customer accounts. Operator terminal 58 may include a computer system. As used in this document, the term "computer" refers to any suitable device operable to accept input, process the input according to predefined rules, and produce output, for example, a personal computer, workstation, network computer, wireless data port, wireless telephone, personal digital assistant, one or more processors within these or other devices, or any other suitable processing device. Although shown as a separate component, operator terminal 58 may include or be partially or completely integrated with the other components of issuer 12.

Data management system 56 may manage data associated with cards 14 and their associated accounts, which may, in particular embodiments, include creating, modifying, and deleting data files associated with cards 14. Additionally, data management system 56 may call one or more function modules 52 to provide particular functionality according to particular needs, as described more fully below. Data management system 56 may include a data processing unit 60, a memory unit 62, a network interface 64, and any other suitable components for managing data associated with cards 14. The components of data management system 56 may be supported by one or more computer systems at one or more sites. One or more components of data management system 56 may be separate from other components of data management system 56 and one or more suitable components of data management system 56 may, where appropriate, be incorporated into one or more other suitable components of data management system 56. Further, data management system may be integrated with any of the other components of issuer 12.

Processing 60 may process data associated with cards 14 and their associated accounts, which may include executing software or coded instructions that may in particular embodiments be associated with the one or more function modules 52. Memory 62 may be coupled to processor 60 and may include one or more suitable memory devices, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors.

A function module 52 may provide particular functionality associated with handling cards 14, such as, for example, generating cards 14, selling cards 14 to customers, setting up cards 14, activating cards 14 for use, enabling transactions using cards 14, providing security, managing the monetary values 20 stored on certain monetary cards (such as stored-value cards) and/or deactivating cards 14, for example. A function module 52 may be called by data management system 56 to perform the particular functionality associated with the function module 52.

According to the embodiment shown in FIG. 1, function modules 52 may include a card management module 70, account management module 72, transaction module 74, and sales tax information management module 76. Like data management system 56, function modules 52 may be physically distributed such that each function module 52 or multiple instances of each function module 52 may be located in a different physical location geographically remote from each other, from data management system 56, or both. In addition, each function module 52 may be partially or completely integrated with other function modules 52 and/or with other components of issuer 12. For example, particular function modules 52 may include one or more operator terminals 58 such that at least a portion of the functionality of such function modules 52 is provided by human operators. Thus, it should be understood that the functionality provided by each function module 52 may be completely automated, partially automated, or completely human-controlled.

Card management module 70 may provide functionality associated with providing cards 14 to customers. For example, module 70 may perform functionality associated with advertising, mailings, card manufacture, card setup, card vending, etc. This module may be operable, for example, to write, or store, various data in memory device(s) on a card 14, including one or more of initial monetary value 20, customer identification code 22, card identification code 24, expiration date 26, and account number 28 for the card 14. Some or all of such data may be stored on a card 14 before the card is provided to a customer, or during activation of, or purchase of, the card. Module 70 may also provide card activation functionality. The card holder or an operator, or other suitable entity, may interface with module 70 to activate cards 14.

Account management module 72 may perform any functionality associated with the management of account information. For example, module 72 may enable the storage of account information in memory 62. Account information may include any information applicable to a particular account. Such information may include, without limitation, names, addresses, social security numbers, codes, balances, available credit, payment information, transaction histories, billing information, birthdates, passwords, account types, etc. Module 72 may be accessed any time an event occurs, which affects an account. For example, a purchase by a consumer using a credit card would change the available credit information in the account records associated with the credit card account.

Transaction module 74 may be generally operable to manage transactions (or attempted transactions) made using a card 14. For example, transaction module may be operable to receive information concerning a transaction from a point of sale device or other sales device, which generates sales or other transaction information. In at least one example embodiment, sales information is generated by a card reading device. The sales information is transmitted to the issuer 12 via a communications network and may be processed using module 74. Transaction information can include any information related to any transaction. Transactions may include the sale or purchase of goods or service. Transaction information may include, without limitation, merchant identification information, transaction amount, purchased item information, date, time, purchaser identity information, sales tax information, location information, customer and card codes, account numbers, etc.

Sales tax information management module 76 may manage, or be used to process, any information associated with sales tax. Such information may include, for example, purchase type information, location information, purchase amount information, sales tax amount and/or percentage information, date and time information, merchant identity information, purchaser identity information, etc. Preferably, module 76 is used to receive, process, store, and generate sales tax information. Module 76 may receive sales tax information, for example, in the transmission of data from a merchant to the issuer. Module 76 may process sales tax information, for example, by changing the format and/or data structure of the received sales tax information. Module 76 may store sales tax information, for example, by storing associated data in memory 62. Such data may be stored according to any suitable data storage method. However, in at least one embodiment, sales tax data is stored in records having fields. Module 76 may generate sales tax information, for example, by retrieving sales tax data from memory 62. Preferably, such data is accessible to operators within issuer 12. In certain embodiments, the data is also accessible directly by customers. Alternatively, the data may be accessible indirectly by customers after the data has been retrieve, processed, and converted into a medium or display format which is accessible by the customer. For example, in certain embodiments, the customer may be provided with a report containing the sales tax information in a predetermined format, or in a format selected by the customer. In another alternative, the customer may view the information through the use of web interface. In other situations, the customer may receive the information audibly from a human or by way of a voice activated and/or menu driven phone system or call center system.

Module 76 may also be employed to generate requests for sales tax information. For example, if the received information is missing a certain type of data, module 76 may recognize the absence of such data and generate a request for the data. The request may be sent to any suitable source from which the information may be obtained. In one embodiment, the request is sent to a customer. In another embodiment, the request is sent to merchant (e.g., electronically communicated from issuer 12 to merchant 13 or to an electronic component within merchant 13). In another embodiment the request is sent to another database. For example, depending on the type of information being sought, the request may be sent to a database storing that particular type of information. The request may include various parameters, which may be portions of the sales tax information data, for example. In one example, if the sales tax amount is missing, but the transaction location and purchase amount are known, module 76 may generate a request to a sales tax rate lookup table stored in a database. Based on the location information, module 76 may retrieve the applicable tax rate. Based on the purchase amount, module 76 may calculate the tax amount. This information may then be stored, or later retrieved, as previously described.

FIG. 2 illustrates an example method for managing sales tax information associated with purchase made using a monetary card. At step 200 a customer makes a purchase. In at least one embodiment the purchase is made using a monetary card (such as a credit card) at a point of sale device. However, the other types of purchases may be incorporated into the method. For example, even purchases made without monetary cards may be made. For example, it is possible, in certain circumstances, to make a purchase without a card if a customer provides a suitable code linked to a financial account. Any such transaction may be utilized as long as transaction data may be captured. Also, although the term "customer" is used, any entity conducting a transaction that generates transaction data may fall within the scope and spirit of at least certain embodiments of the invention.

At step 202, the merchant sends transaction information. This information may be sent by any suitable method. In one embodiment, the transaction data is sent electronically from a point of sale device. However, the data may be sent via any method including, for example, orally over a telephone. In one embodiment, the information is sent directly to a card issuer. In other embodiments, the information is sent indirectly to the card issuer and may pass through a number of other entities (e.g., financial institutions) prior to reaching the issuer. In still other embodiments, the information may be sent to an entity distinct from the issuer for processing and storage in accordance with the above description provided in connection with FIG. 1. The information may be transmitted through any suitable communications network and in any suitable format and/or protocol. Although the term "merchant" is used, it is envisioned that other entities might send the transaction information.

At step 204, the transaction information is received. In at least one embodiment, the information is received by a card issuer. As already discussed, however, other scenarios may exist. The issuer receives the information, for example, through a network interface. Preferably, the issuer executes one or more applications, using software (for example) to process the information. Processing may include changing the format of the information. Processing preferably includes at least analyzing the information to determine whether it includes one or more pieces of sales tax information.

At step 206, a determination is made whether the transaction information includes one or more pieces of sales tax information. This may be accomplished, for instance, by one or more processors. The sales tax information being sought may include one or more of a plurality of parameters such as, for example, purchaser name, purchase type, purchase amount, location, date and time information, merchant identity information, codes, sales tax amount, sales tax rate, and any other information already discussed herein or which may be associated with a financial transaction. If the determination is made that all of the desired sales tax information is included in the transaction information, the method proceeds to step 222 where the transaction information is stored. If, however, the determination is made that all of the desired sales tax information is not included, then, in step 208, another determination is made.

In step 208, a determination is made whether the missing sales tax information is information that may be available from the merchant. If so, in step 210 a request is generated and sent to the merchant requesting the missing information. The request may be sent according to any of the techniques already discussed. At step 212, the merchant receives the request, generates the required information, and transmits the information to the issuer. If, at step 208, the determination is made that the missing sales tax information will not be available from the merchant, then, at step 214, another determination is made.

At step 214, a determination is made whether missing sales tax information is available from another source (other than the merchant). Other sources may include, without limitation, another entity, such as a customer, or a database. If the determination is made that the information will not be available from any other source, then the search for missing information is ended at step 220 and the method continues at step 222 with whatever information is available. If the determination is made that the information is available from another source, then, at step 216, a request is generated and transmitted to the other source. At step 218, the other source receives the request, generates and/or retrieves the information, and transmits the information to the issuer. In certain embodiments, requests for missing information may be sent to any or all potential sources without first determining whether the information will be available. In such situations, the sources (e.g., merchant or database) will simply provide the information if it is available.

The missing information obtained from the merchant or other sources may be any portion of the transaction information. As an example, sales tax information, such as the sales tax amount, may be missing. The determination may be made that the merchant will not have this information. Thus, the method dictates that a request be generated and transmitted to a database having tax rates for various jurisdictions. The request may include information necessary to prompt the source to return the desired information. For example, a request for a tax rate might include location information. This might be used, for example, by an application to determine what tax rate to retrieve from the database. Once the tax rate is retrieved, then the purchase amount and tax rate may be used to calculate the amount of sales tax. Thus, in generating requests for missing information, collateral sales tax information may be used. This already-available information may also be used to process the retrieved missing information to calculate additional missing information.

At step 222, the transaction information is stored. The information may be stored in any suitable memory device, or manually. The information may be stored according to any acceptable data storage format or protocol. For example, the information may be stored electronically in one or more databases in electronic records having fields corresponding to the various pieces of information. Also, the information may first be processed to determine which pieces of information will be stored and in what form. For instance, the transaction information may include sales tax information to be stored in one location by one module or application, and other information to be stored in a different location.

At step 224, a customer requests sales tax information from the issuer. Although the information is being requested from the issuer, the request may be made of any entity that has control of or access to, the information. For example, the request may be made to a third party that in turn accesses the information from the issuer or whatever entity has the information. Also, while a "customer" is referred to as making the request, the request may be made by other entities or by, for example, software applications. For instance, a request may be generated by a tax preparation application that interfaces with the issuer to request and retrieve the sales tax information.

At step 226, a report is generated and provided to the customer (or another entity or application making the request in step 224). The report may be provided in any suitable format. Report formats may include a plurality of parameters that are predetermined. Alternatively, the customer may select among various parameters to customize the report format. Reports may be provided electronically, on an electronic medium, in hard-copy form, orally, through computer-generated voices or other signals, through the use of a graphic user interface, online, on a web site, or by any other suitable method.

According to one embodiment, one or more suitable issuer components interface with a tax preparation application to provide the sales tax information to the application for use in preparing a tax return. The tax preparation application may be executed remotely from the issuer, or may be incorporated into the issuer system. According to an aspect of this configuration, the sales tax information is automatically generated and/or retrieved and automatically downloaded into the appropriate memory or record fields of the tax preparation application. According to an alternative, the sales tax information may be transmitted to other entities, such as an accountant, or the taxing authority.

Modifications, additions, or omissions may be made to the method without departing from the scope of the invention. Additionally, steps may be performed in any suitable order without departing from the scope of the invention.

Although an embodiment of the invention and its advantages are described in detail, a person skilled in the art could make various alterations, additions, and omissions without departing from the spirit and scope of the present invention as defined by the appended claims.

The invention claimed is:

1. A method for managing sales tax information associated with purchases made using a financial account, the method comprising:

receiving transaction information associated with a transaction made with a merchant using the financial account, the transaction information received electronically from the merchant at the time of the transaction and used to process the transaction, the transaction information comprising sales tax information for the transaction;

processing the transaction using at least a portion of the transaction information;

storing the sales tax information using a data management system;

providing the sales tax information to a user in response to a request for the sales tax information; and using one or more computer processors, automatically providing the sales tax information to a tax return preparation application, the tax return preparation application using the sales tax information to prepare an electronic tax return.

2. The method of claim 1, wherein the transaction is received electronically over a communications network.

3. The method of claim 1, wherein the transaction information is received from a merchant.

4. The method of claim 1, wherein the transaction information is received from a point of sale device.

5. The method of claim 1, wherein the sales tax information comprises purchaser identity information.

6. The method of claim 1, wherein the sales tax information comprises merchant identity information.

7. The method of claim 1, wherein the sales tax information comprises transaction location information.

8. The method of claim 1, wherein the sales tax information comprises transaction time of day information.

9. The method of claim 1, wherein the sales tax information comprises transaction date information.

10. The method of claim 1, wherein the sales tax information comprises transaction amount information.

11. The method of claim 1, wherein the sales tax information comprises sales tax amount information.

12. The method of claim 1, wherein the sales tax information comprises tax rate information.

13. The method of claim 1, further comprising the steps of determining whether the received transaction information comprises all of a plurality of desired pieces of sales tax information; and electronically requesting additional sales tax information from the merchant when the received transaction information does not comprise all of the plurality of desired pieces of sales tax information.

14. The method of claim 1, further comprising the steps of:

generating an electronic request for missing sales tax information;

providing the electronic request to the merchant; and receiving additional sales tax information from the merchant.

15. The method of claim 14, wherein the electronic request is based on at least a portion of the received sales tax information.

16. The method of claim 14, wherein the additional sales tax information received from the merchant in response to the electronic request for missing sales tax information is used to determine further missing sales tax information available from a source other than the merchant.

* * * * *

UNITED STATES PATENT AND TRADEMARK OFFICE
CERTIFICATE OF CORRECTION

PATENT NO. : 7,584,884 B2  Page 1 of 1
APPLICATION NO. : 11/221229
DATED : September 8, 2009
INVENTOR(S) : Fox et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 844 days.

Signed and Sealed this

Fourteenth Day of September, 2010

David J. Kappos
*Director of the United States Patent and Trademark Office*